United States Patent [19]

Luter et al.

[11] Patent Number: 4,643,484
[45] Date of Patent: Feb. 17, 1987

[54] MANUALLY ADJUSTABLE WHEELS

[75] Inventors: Charles H. Luter, Highfield, England; Nils L. Lethin, Kolding, Denmark; Johan Møeller, Lunderskov, Denmark; Bjarne R. Holm, Vamdrup, Denmark

[73] Assignee: Karl Moeller Nagbol, Lunderskov, Denmark

[21] Appl. No.: 654,737

[22] Filed: Sep. 27, 1984

Related U.S. Application Data

[63] Continuation of Ser. No. 187,670, Sep. 16, 1980, abandoned.

[51] Int. Cl.[4] .................. B60B 3/04; B60B 23/00
[52] U.S. Cl. .................. 301/11 S; 301/63 D; 301/68; 301/69
[58] Field of Search ............ 29/159.01; 301/11 R, 301/11 S, 12 R, 23, 24, 25, 63 R, 63 D, 68, 69, 1

[56] References Cited

U.S. PATENT DOCUMENTS

| 1,555,786 | 9/1925 | Main | 301/63 R |
| 1,570,645 | 1/1926 | Roche | 301/11 S |
| 1,744,915 | 1/1930 | Nelson | 301/11 R X |
| 2,545,943 | 3/1951 | Eksergian | 301/11 R |
| 2,584,309 | 2/1952 | Voorhees | 301/63 R |
| 3,790,216 | 2/1974 | Peterson | 301/1 |

FOREIGN PATENT DOCUMENTS

| 928868 | 6/1955 | Fed. Rep. of Germany | 301/63 R |
| 2609031 | 9/1977 | Fed. Rep. of Germany | 301/11 R |

OTHER PUBLICATIONS

Hanumug, "Powerful Tractors for Every Plant", Rheinstaahl-Hanunag, Oct. 1, 1974.

Primary Examiner—David A. Scherbel
Attorney, Agent, or Firm—Marshall, O'Toole, Gerstein, Murray & Bicknell

[57] ABSTRACT

A manually adjustable wheel for, e.g. a tractor, comprising a generally octagonal disc having four longer sides and four shorter sides, the rim having lugs to which the disc is bolted, the rim/disc bolts being arranged in pairs on the shorter sides of the disc only.

3 Claims, 6 Drawing Figures

'PRIOR ART'

MANUALLY ADJUSTABLE WHEELS

This application is a continuation of our copending application Ser. No. 187,670 filed Sept. 16, 1980, now abandoned.

BACKGROUND OF THE INVENTION

1. Field of the Invention

This invention relates to a manually adjustable wheel for a high horse power vehicle such as an agricultural tractor.

2. Description of the Prior Art

It is known to provide agricultural tractors with manually adjustable wheels whereby the track, i.e. the spacing between the driven wheels of the tractor, may be adjusted to suit its use in differing agricultural situations where for example differing widths of rows of crops have to be traversed by the tractor. Such known manually adjustable wheels usually comprise a rim detachably secured to a disc which is itself detachably secured in conventional manner to a hub at the end of a drive shaft. The means for detachably securing the rim to the disc usually comprises a plurality of lugs spaced apart circumferentially around the radially inner surface of the rim.

The disc usually comprises a generally circular steel element having a scalloped periphery, the apices of the scallops providing circumferentially spaced apart portions of the disc adjacent the rim which are bolted to the lugs.

SUMMARY OF THE INVENTION

It is an object of the invention to provide a manually adjustable wheel wherein the amount of material used in the disc is optimised having regard to the required strength of the wheel.

According to the invention we provide a manually adjustable wheel for a vehicle, e.g. a tractor, comprising:

a rim to receive a tyre;

a plurality of fixing lugs spaced apart around the radially inner periphery of the rim;

a disc arranged for connection to a hub of the vehicle; and bolt means detachably securing the disc to the lugs; the disc and the lugs being arranged so that the disc may be selectively secured to the lugs in either of two positions characterised in that:

the disc has substantially the shape of a square with the corners cut off so that the disc has an irregular octagonal shape having four longer sides and four shorter sides arranged alternately around the periphery of the octagon;

and in that the bolt means are located along the shorter sides of the disc only.

The bolt means may comprise two bolts passing through the disc at each of the shorter sides thereof. The lugs may be of generally top hat section and arranged either with their channels extending parallel to the rotary axis of the wheel or at right angles to such rotary axis.

BRIEF DESCRIPTION OF THE DRAWINGS

The features of the invention will become apparent from the following description given herein solely by way of example with reference to the accompanying drawings wherein.

DESCRIPTION OF THE PREFERRED EMBODIMENTS

Figure 1:
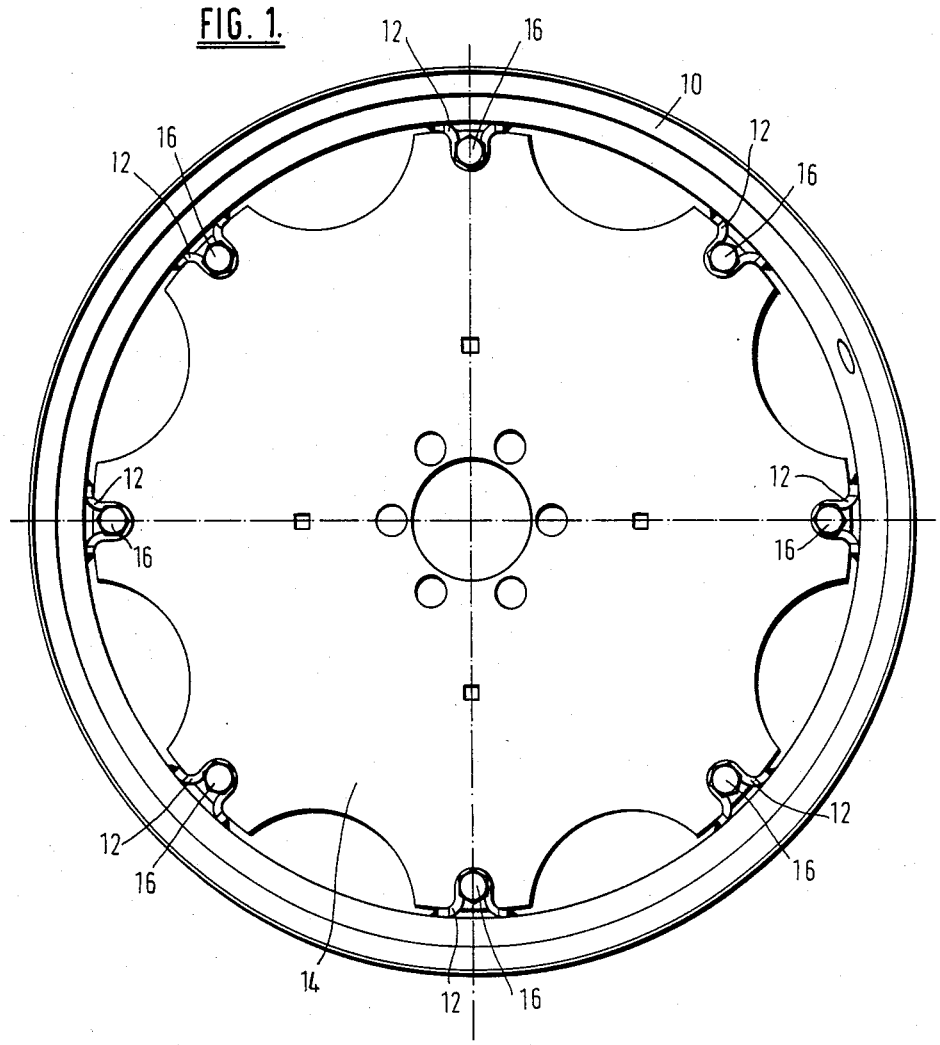
FIGS. 1 and 2 are axial views of manually adjustable wheels constructed in accordance with the prior art.
Figure 2:
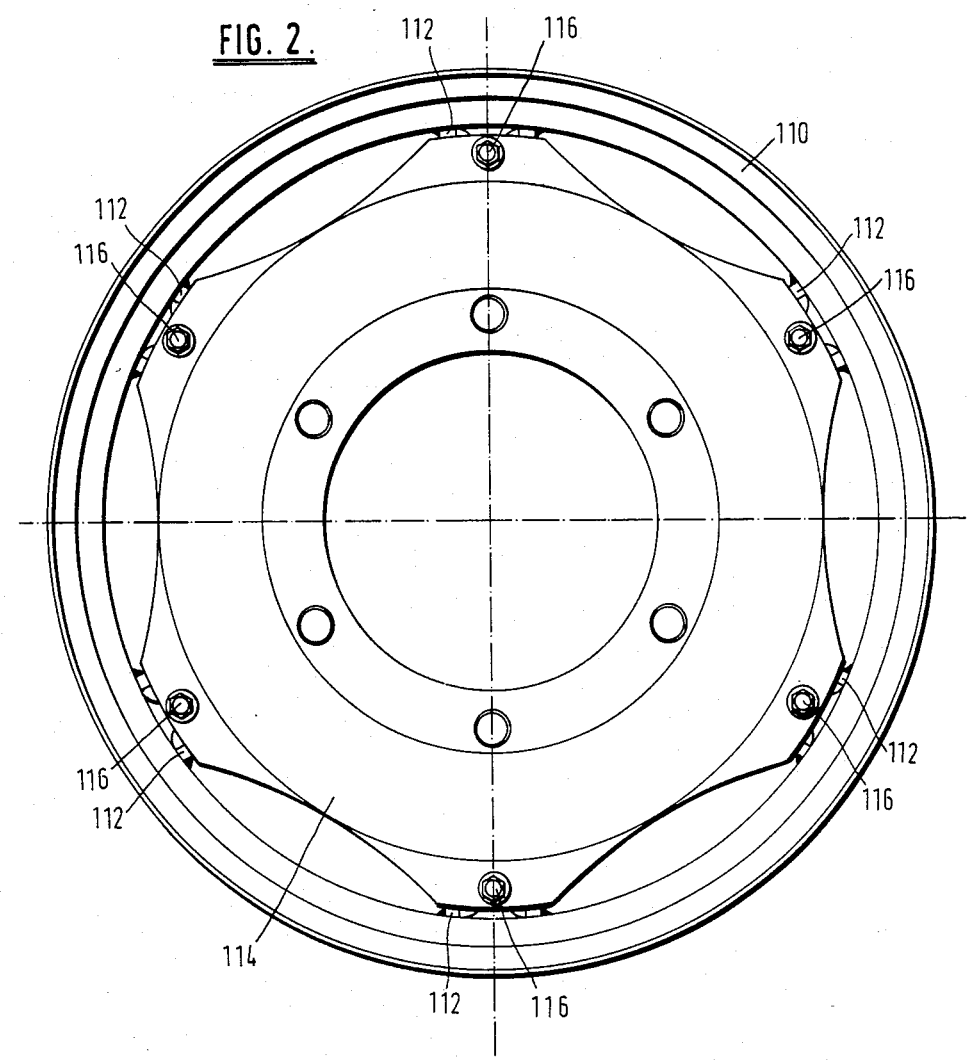

FIGS. 1 and 2 of the drawings show manually adjustable tractor wheels as constructed by prior art methods. Thus, referring to FIG. 1, it will be seen that the wheel rim 10 is provided on its radially inner surface with a set of eight equi-distantly spaced apart lugs 12 welded to the rim. The disc 14, which is detachably secured to the rim lugs 12 by means of bolts 16, is of generally circular configuration but has a scalloped periphery with the apices of the scallops providing portions adjacent the rim which are boltable to the lugs.

FIG. 2 of the drawings shows a similar construction of wheel wherein six circumferentially spaced lugs 112 are provided on the rim 110 to which six corresponding portions of a generally circular disc 114 are boltable.

In each case the variation in track is obtained by (1) varying the surface of the disc which is in contact with the hub and (2) varying the ends of the lugs against which the disc abuts.

In each of the constructions shown in FIGS. 1 and 2 the construction of the disc 14 is extremely wasteful of metal since it is generally circular and is usually produced as a steel stamping out of a square or rectangular blank.

Figure 3:
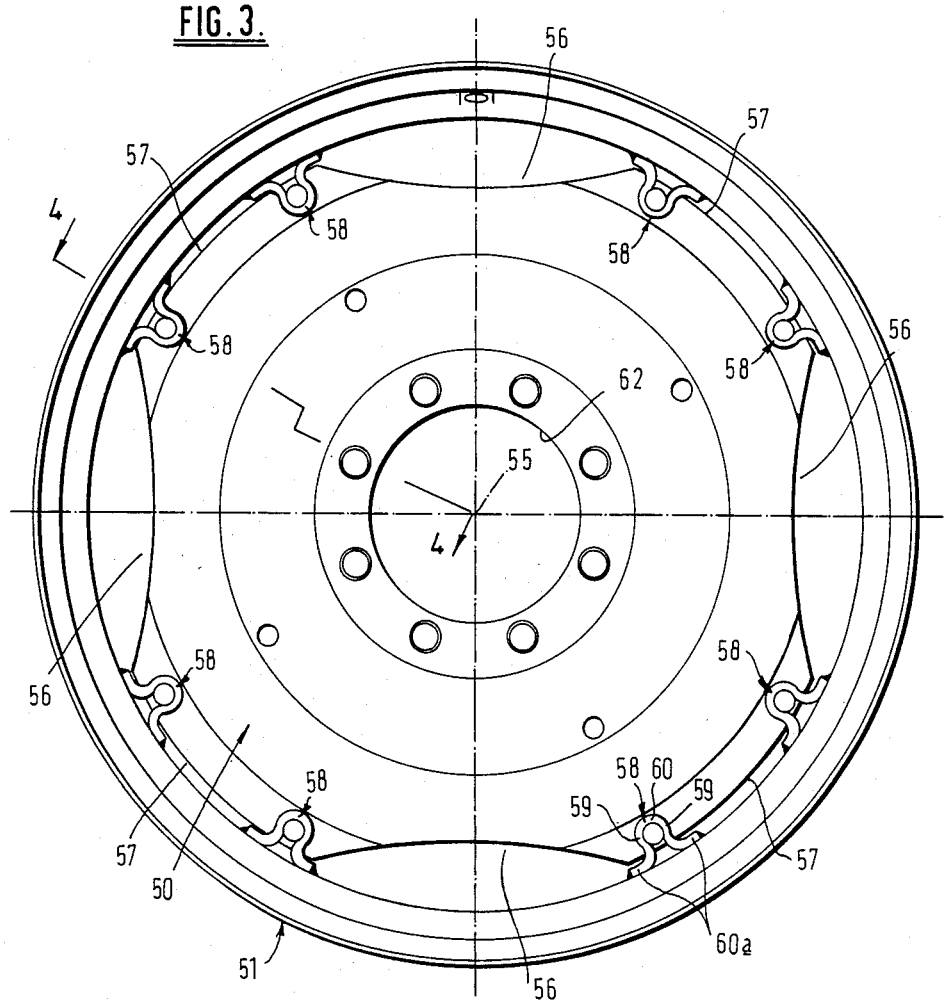
FIG. 3 is an axial view of a manually adjustable wheel constructed in accordance with a first embodiment of the invention.
Figure 4:
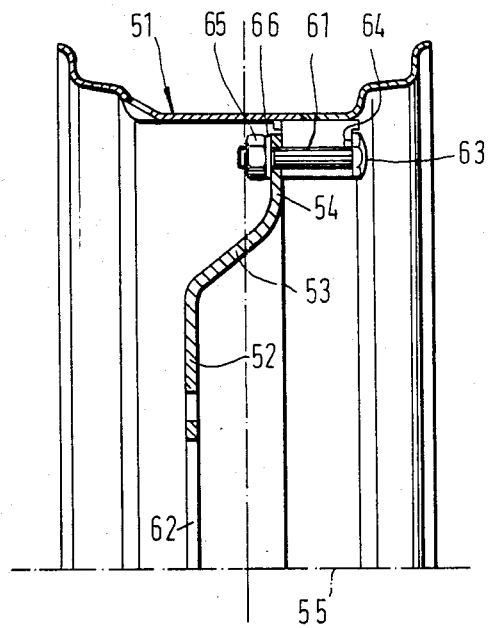
FIG. 4 is a cross-sectional view on the line 4—4 of FIG. 3.

Referring now to FIGS. 3 and 4, these show a first embodiment of the invention. There is a disc 50 secured to a rim 51. The disc has a central planar portion or nave 52 and a conical portion 53 leading to a portion 54 which is perpendicular to the rotary axis 55 of the wheel. The disc is made from a square blank and as shown in FIG. 3 is generally octagonal in shape having four longer sides 56 which alternate, around the periphery of the disc, with shorter sides 57. It will be noted that the longer sides 56 are slightly concave towards the centre of the disc while the shorter sides 57 are convex towards the centre of the disc. It will be seen from FIG. 4 that the disc is of uniform thickness.

Secured to the radially inner periphery of the rim are eight lugs 58 which are arranged in pairs with a circumferential spacing between the lugs of each pair being less than the circumferential spacing between adjacent lugs of adjacent pairs. These lugs are generally of top hat section and provide, referring to one of the lugs, a channel having sides 59, a base 60 and flanges 60a. The flanges 60a are welded to the rim and the channel in the lug extends generally parallel to the rotary axis of the wheel and receives a bolt 61 which passes through the lug and through an aperture 62 in the disc. Each bolt has a head 63 and is prevented from turning by a rib 64 under the head which fits in the channel of the lug as shown in FIG. 4, and carries a nut and washer 65 and 66 respectively. It will be noted that the apertures 62 and the bolts 61 are located on the shorter sides only of the disc.

Variation in track of a vehicle having wheels as shown in FIGS. 3 and 4 is obtained either by reversing the disc 50 so that it diverges towards the left rather than the right in FIG. 4 and/or, by arranging the part 54 of the disc at one side or the other of the lugs 58.

Figure 6:
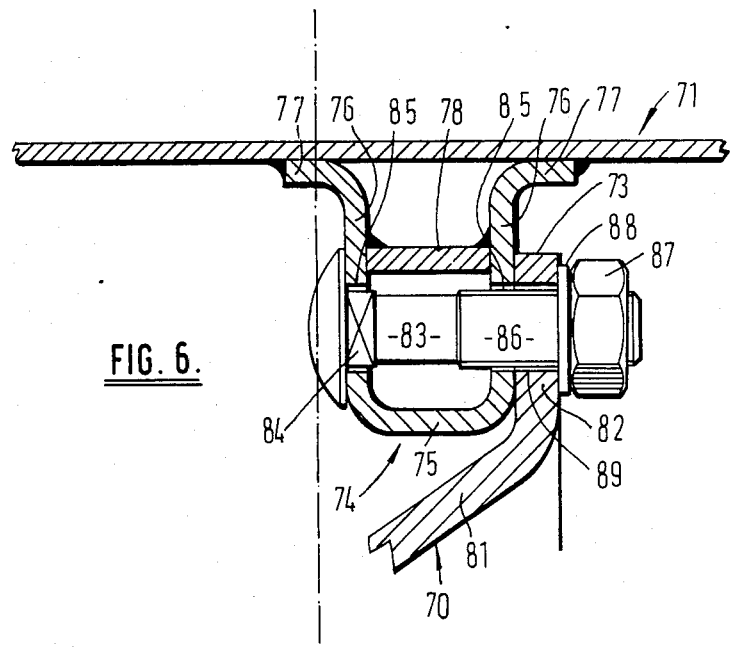
FIG. 6 is a cross-sectional view on the line 6—6 of FIG. 5.
Figure 5:
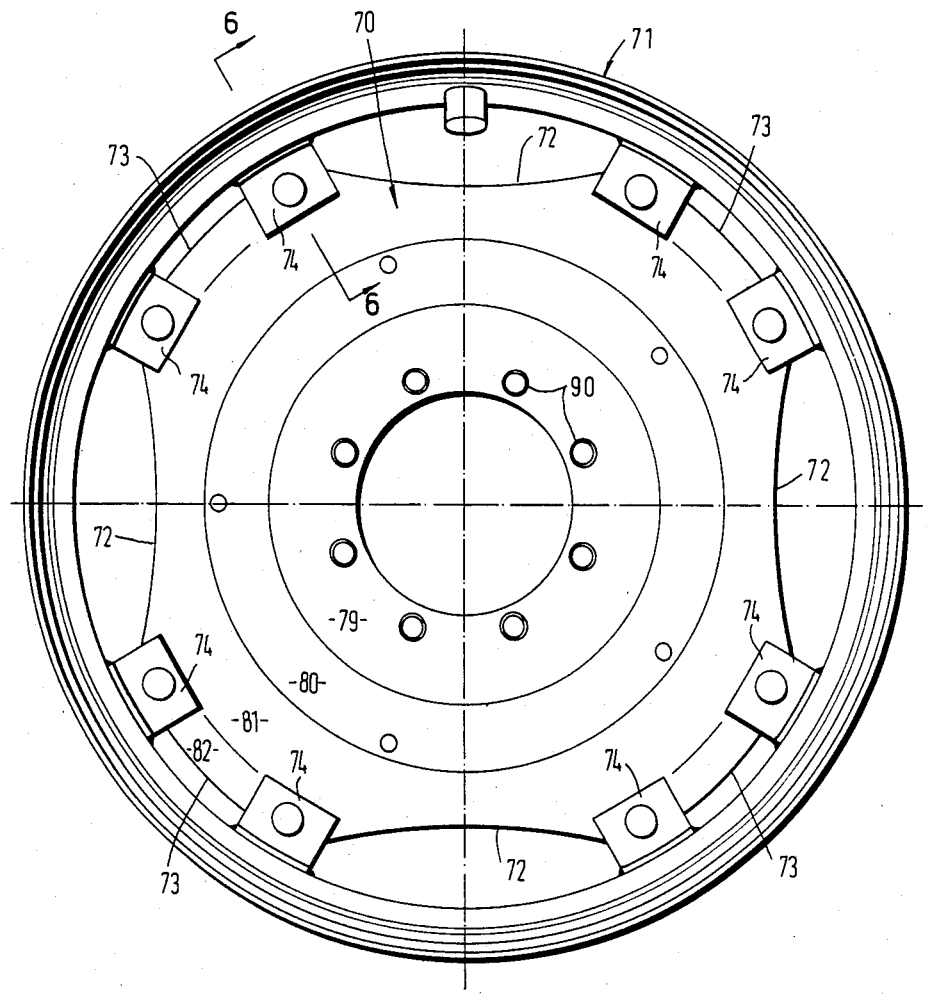
FIG. 5 is an axial view of a manually adjustable wheel constructed in accordance with a second embodiment of the invention.

Referring now to FIGS. 5 and 6, these show a first embodiment of the invention comprising a disc 70 and a rim 71. As shown in FIG. 5, the disc has been made from a square blank and has four longer sides 72 and four shorter sides 73 so that it has the shape of an irregular octagon. It will be noted that the longer sides 72 are slightly concave towards the centre of the disc while the shorter sides 73 are slightly convex relative to the centre of the disc.

The rim is secured to the disc by lugs and bolts as before. The lugs indicated at 74 are arranged in pairs as described in relation to FIGS. 3 and 4 and as shown in FIG. 6 are of top hat cross-section having a base 75, side walls 76 and flanges 77. The flanges 77 are welded to the rim so that the channels in the top hat section extend perpendicular to the rotary axis of the wheel. Each lug is strengthened by a gusset plate 78.

Still referring to FIG. 5, the disc 70 has a central portion 79 adapted to be secured to the hub of a vehicle via apertures 90 and bolts or studs (not shown), it then has a portion 80 which is perpendicular to the rotary axis of the wheel but displaced from the portion 79. Outwardly of the portion 80 is a conical portion 81 which then leads to a portion 82 perpendicular to the rotary axis of the wheel. The portion 82 provides the shorter sides 73.

The disc is secured to the wheel by bolts 83 which have squared portions 84 on their shanks to engage in square section holes 85 in the walls 76 of a lug, each bolt having a threaded portion 86 to receive a nut 87 and washer 88.

It will be noted that the bolts 83 pass through apertures 89 in the disc and that these apertures are located in the shorter sides 73. Variation in track of a vehicle having wheels as shown in FIGS. 5 and 6 is obtained as before either by reversing the position of the disc and/or by changing the side wall of the lug against which the portions 82 of the disc abut.

It will be seen that the invention provides two embodiments of wheels, specially for tractors, in which the discs can be made from square blanks with very little waste in material as compared with the considerable waste in material involved where the blanks are circular as shown in FIGS. 1 and 2 which relate to the prior art.

What is claimed is:

1. A manually adjustable wheel for a vehicle, e.g., a tractor, comprising:
    a rim to receive a tyre;
    a plurality of channel-shaped fixing lugs spaced apart around the radially inner periphery of the rim, the lugs being arranged in pairs with the circumferential spacing between the lugs of each pair being less than the circumferential spacing between adjacent lugs of adjacent pairs, the lugs having flanges which overlie, and are welded to, the rim thus fixedly to secure the lugs to the rim;
    a disc of uniform thickness for connection to a hub of the vehicle;
    the disc having substantially the shape of a square with the corners cut off so that the disc has an irregular octagonal shape having four longer sides and four shorter sides arranged alternately around the periphery of the octagon and with each shorter side being juxtaposed against a pair of lugs; and
    bolt means detachably securing the disc to the lugs, the disc and lugs being arranged so that the disc may be selectively secured to the lugs in either of two positions, the bolt means being located along the shorter sides of the disc only and, at each of said shorter sides comprising two bolts with each bolt passing through the disc and through one of the lugs of a pair of lugs juxtaposed to said shorter side.

2. A wheel according to claim 1 characterised in that the channels in the lugs extend parallel to the rotary axis of the wheel and each is shaped closely to embrace one of said bolts which extends lengthwise through the channel.

3. A wheel according to claim 1 characterised in that the channels in the lugs extend perpendicular to the rotary axis of the wheel and each lug receives one of said bolts extending transversely across the channel and through the walls thereof.

* * * * *